(12) United States Patent
Chien (10) Patent No.: US 12,236,823 B2
(45) Date of Patent: Feb. 25, 2025

(54) DRIVER CIRCUIT DRIVING DISPLAY PANEL IN TWO MODES

(71) Applicant: Novatek Microelectronics Corp., Hsinchu (TW)

(72) Inventor: Tso-Hua Chien, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/423,213

(22) Filed: Jan. 25, 2024

(65) Prior Publication Data

US 2024/0355253 A1    Oct. 24, 2024

Related U.S. Application Data

(60) Provisional application No. 63/460,596, filed on Apr. 19, 2023.

(30) Foreign Application Priority Data

Oct. 18, 2023  (TW) ................................ 112139736

(51) Int. Cl.
   *G09G 3/20*     (2006.01)
   *G06F 3/041*    (2006.01)

(52) U.S. Cl.
   CPC ............. *G09G 3/20* (2013.01); *G06F 3/0412* (2013.01); *G06F 3/0416* (2013.01); *G09G 2310/04* (2013.01); *G09G 2330/021* (2013.01); *G09G 2340/0435* (2013.01); *G09G 2354/00* (2013.01)

(58) Field of Classification Search
   CPC ................ G09G 3/20; G09G 2310/04; G09G 2330/021; G09G 2340/0435; G09G 2354/00; G06F 3/0412; G06F 3/0416
   See application file for complete search history.

(56) References Cited

U.S. PATENT DOCUMENTS

| 10,032,430 B2 | 7/2018 | Huang et al. |
| 2011/0032231 A1* | 2/2011 | Maruyama ........... G09G 3/2096 345/208 |
| 2016/0078838 A1 | 3/2016 | Huang et al. |
| 2019/0237021 A1* | 8/2019 | Peng ..................... G09G 5/003 |

(Continued)

FOREIGN PATENT DOCUMENTS

| CN | 105427782 | 5/2019 |
| CN | 115240594 | 10/2022 |
| CN | 115497433 | 12/2022 |

OTHER PUBLICATIONS

"Office Action of Taiwan Counterpart Application", issued on Sep. 30, 2024, p. 1-p. 5.

*Primary Examiner* — Rodney Amadiz
(74) *Attorney, Agent, or Firm* — JCIPRNET (57) ABSTRACT

A driver circuit suitable driving a display panel is provided. The driver circuit includes a display driver circuit and a touch driver circuit. The display driver circuit drives the display panel to be operated in a first mode or a second mode. In the first mode, different areas of the display panel have different frame rates. In the second mode, different areas of the display panel have a same frame rate. The touch driver circuit is coupled to the display driver circuit. The touch driver circuit detects a touch event. When the touch driver circuit detects the touch event, the display driver circuit drives the display panel to be switched from the first mode to the second mode.

10 Claims, 8 Drawing Sheets

(56) References Cited

U.S. PATENT DOCUMENTS

| | | | |
|---|---|---|---|
| 2020/0150805 A1* | 5/2020 | Kim | H10K 59/40 |
| 2020/0402478 A1* | 12/2020 | Her | G09G 3/3233 |
| 2022/0114946 A1* | 4/2022 | Howard | G09G 3/2096 |
| 2022/0189408 A1* | 6/2022 | Jo | G09G 3/3275 |
| 2023/0019167 A1* | 1/2023 | Hu | G06F 3/04166 |
| 2023/0222993 A1* | 7/2023 | Sim | G09G 5/005 |
| | | | 345/698 |
| 2024/0346996 A1* | 10/2024 | Yang | G09G 3/32 |

* cited by examiner

DRIVER CIRCUIT DRIVING DISPLAY PANEL IN TWO MODES

CROSS-REFERENCE TO RELATED APPLICATION

This application claims the priority benefit of U.S. application Ser. No. 63/460,596, filed on Apr. 19, 2023 and Taiwan application serial no. 112139736, filed on Oct. 18, 2023. The entirety of the above-mentioned patent application is hereby incorporated by reference herein and made a part of this specification.

BACKGROUND OF THE INVENTION

Field of the Invention

The invention relates to a driver circuit, and in particular, to a driver circuit driving a display panel.

Description of Related Art

On a traditional display panel, the entire display area displays one or a plurality of images at a certain same frame rate. In some applications, such as mobile phone applications, the entire display area may be divided into a plurality of partitions, but the different partitions all display images at the same frame rate. In many usage scenarios, often only one partition needs to refresh the screen frequently (for example, playing animation), and another partition has a static screen and does not need to refresh the screen frequently.

SUMMARY OF THE INVENTION

The invention provides a driver circuit that may determine a frame rate of each area of a display panel according to a detection result of a touch event.

A driver circuit of the invention driving a display panel. The driver circuit includes a display driver circuit and a touch driver circuit. The display driver circuit drives the display panel to be operated in a first mode or a second mode. In the first mode, different areas of the display panel have different frame rates. In the second mode, different areas of the display panel have a same frame rate. The touch driver circuit is coupled to the display driver circuit. When the touch driver circuit detects a touch event, the display driver circuit drives the display panel to be switched from the first mode to the second mode.

In an embodiment of the invention, the display panel includes a first area and a second area. In the first mode, the first area has a first frame rate and the second area has a second frame rate. The second frame rate is less than the first frame rate. When the touch driver circuit detects the touch event occurs in the second area, the display driver circuit drives the display panel to be switched from the first mode to the second mode.

In an embodiment of the invention, the display panel includes a first area and a second area. In the first mode, the first area has a first frame rate and the second area has a second frame rate. The second frame rate is less than the first frame rate. When the touch driver circuit detects the touch event occurs in the second area, the display driver circuit drives the display panel so that the second area is operated at a third frame rate. The third frame rate is less than the second frame rate.

In an embodiment of the invention, the display panel includes a first area and a second area. In the first mode, the first area has a first frame rate and the second area has a second frame rate. The second frame rate is less than the first frame rate. When the touch driver circuit detects the touch event occurs in the first area, the display driver circuit drives the display panel so that the display panel continues to be operated in the first mode.

In an embodiment of the invention, the display panel includes a first area and a second area. In the first mode, the first area has a first frame rate and the second area has a second frame rate. The second frame rate is less than the first frame rate. When the touch driver circuit detects the touch event occurs in the first area, the display driver circuit drives the display panel so that the first area is switched to the second frame rate.

In an embodiment of the invention, when the touch driver circuit detects the touch event occurs in the first area again, the display driver circuit drives the display panel so that the first area returns to the first frame rate.

In an embodiment of the invention, when the touch driver circuit detects that the touch event is a movement of an object, the display driver circuit drives the display panel to be switched from the first mode to the second mode.

In an embodiment of the invention, a movement trajectory of the object includes a straight trajectory, a diagonal trajectory, or a curved trajectory.

In an embodiment of the invention, when the touch driving circuit detects that the touch event is that the object does not move, the display driver circuit drives the display panel so that the display panel continues to be operated in the first mode.

In an embodiment of the invention, the display panel is switched from the first mode to the second mode after one or a plurality of frames.

In order to make the aforementioned features and advantages of the disclosure more comprehensible, embodiments accompanied with figures are described in detail below.

DESCRIPTION OF THE EMBODIMENTS

The term "coupled to (or connected to)" used in the entire text of the specification of the present application (including claims) may refer to any direct or indirect connecting means.

For example, if it is described in the text that a first device is coupled (or connected) to a second device, it should be interpreted as that the first device may be directly connected to the second device, or the first device may be indirectly connected to the second device via other devices or some connection means. The terms "first" and "second" mentioned in the entire specification of the present application (including the claims) are used to name elements, or to distinguish different embodiments or scopes, and are not used to limit the upper limit or lower limit of the number of elements, nor to limit the sequence of elements. In addition, wherever possible, elements/members/steps using the same reference numerals in the drawings and embodiments represent the same or similar portions. Elements/members/steps having the same reference numerals or having the same terminology in different embodiments may be cross-referenced.

Figure 1:
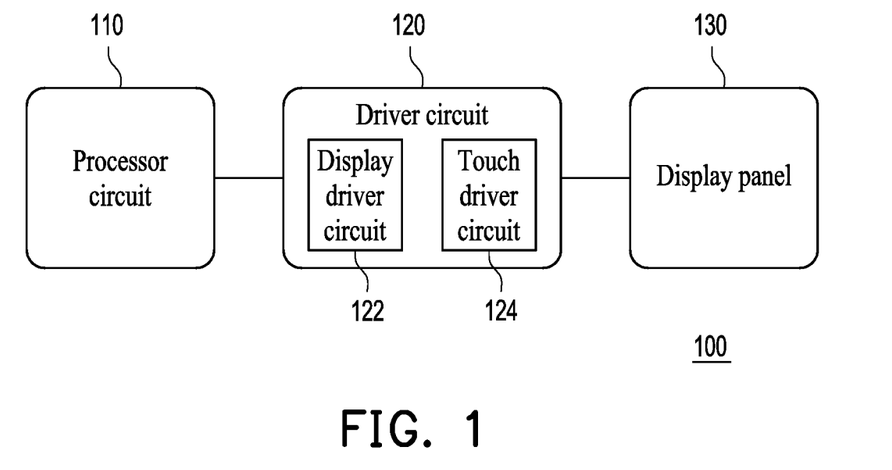
FIG. 1 shows a schematic diagram of an electronic device of an embodiment of the invention.

FIG. 1 shows a schematic diagram of an electronic device of an embodiment of the invention. Referring to FIG. 1, an electronic device 100 includes a processor circuit 110, a driver circuit 120, and a display panel 130. The driver circuit 120 drives a display panel 130. The processor circuit 110 may be an application processor of a mobile phone or a timing controller of a display device, and the invention is not limited thereto.

Specifically, the driver circuit 120 includes a display driver circuit 122 and a touch driver circuit 124. The touch driver circuit 124 is coupled to the display driver circuit 122. The display driver circuit 122 is suitable for driving the display panel 130 to perform a display operation, for example, to drive the display panel 130 to be operated in a first mode or a second mode. The touch driver circuit 124 is suitable for driving the display panel 130 to perform a touch operation to detect a touch event.

The first mode is, for example, an operation mode in which each area on the display panel 130 has a different frame rate, that is, a MAFR (multi-area frame rate) mode. Therefore, in the first mode, different areas of the display panel 130 have different frame rates. For example, the display panel 130 is originally operated at a frame rate of 60 Hz, and the driver circuit 120 receives image data with a frame rate of 75 Hz via a Mobile Industry Processor Interface (MIPI). In the MAFR mode, the upper half area of the display panel 130 is operated at a frame rate of 75 Hz, and the lower half area thereof is operated at a frame rate of 30 Hz. The frame rates of 75 Hz, 60 Hz, and 30 Hz are only used for illustration and are not intended to limit the invention.

The second mode is, for example, an operation mode in which the entire area of the display panel 130 has the same frame rate, that is, the normal mode. Therefore, in the second mode, different areas of the display panel 130 have the same frame rate. For example, in the normal mode, the entire area of the display panel 130 may be operated at a high frame rate, but the invention is not limited thereto. In the normal mode, the entire area of the display panel 130 may also be operated at a low frame rate.

When the entire display area (all partitions) of the display panel is operated at a high frame rate, the overall power consumption of the display panel is higher. At this time, for partitions on the display panel that do not need to refresh the screen frequently, high frame rate is a waste of power. However, when the entire display area (all partitions) of a traditional display panel is operated at a low frame rate, although the power consumption of the display panel is low, for partitions that require frequent screen refresh, the frame rate is too low, and for some applications, such as games and movie viewing, the user is not able to obtain a better display experience.

Therefore, if different display areas in the same display panel are adapted to have different frame rates, the power consumption of the display panel may be reduced. However, executing frame rate changes requires the processor circuit to actively intervene and issue instructions before the switch may be performed. The driver circuit may not switch the frame rate of the display panel on its own. If in the MAFR mode, the processor circuit is still needed to switch modes to return the frame rate of the display panel to a high frame rate, thus providing worse user experience.

The present embodiment provides a method that may perform frame rate switching via the display driver circuit 122. It is particularly important to note that the frame rate switching provided by the present embodiment may coexist with the existing frame rate switching method via a processor circuit. In the present embodiment, the display driver circuit 122 switches the frame rate via a touch event. The touch event includes various touch events such as the finger of the user touching the panel and the palm of the user covering the panel. The display driver circuit 122 may determine the operation mode of the display panel 130 to be the first mode or the second mode according to the detection result of the touch event.

For example, when the touch driver circuit 124 detects that the touch event is a movement of an object, the display driver circuit 122 may drive the display panel 130 to be switched from the first mode to the second mode. Therefore, in an application scenario of an embodiment of the invention, as long as the touch driver circuit 124 detects a touch event, the display panel 130 is switched back to the frame rate of the normal mode (high frame rate).

Alternatively, when the touch driver circuit 124 detects that the touch event is that the object does not move, the display driver circuit 122 may drive the display panel 130 so that the display panel 130 continues to be operated in the first mode without switching to the second mode. Therefore, when the touch driver circuit 124 detects the touch event, the display driver circuit 122 may determine whether to drive the display panel 130 to be switched from the first mode to the second mode.

In the present embodiment, the display panel 130 is operated in the first mode in the current frame, for example, and may immediately be switched from the first mode to the second mode in the next frame. Alternatively, the display panel 130 may be switched from the first mode to the second mode after a plurality of frames. That is, the display panel 130 may be switched from the first mode to the second mode after one or a plurality of frames. Therefore, when returning to the frame rate of the normal mode, the display panel 130 may return to normal in the next frame, or may be switched to normal after a plurality of frames.

In the present embodiment, the electronic device 100 may be an electronic device having a display function, a touch sensing function, or a fingerprint sensing function. In an embodiment, the electronic device 100 may be, but is not limited to, a smart phone, a non-smart phone, a wearable electronic device, a tablet computer, a personal digital assistant, a laptop computer, and other portable electronic devices that may be operated independently and have a display function, a touch sensing function, and a fingerprint sensing function. In an embodiment, the electronic device 100 may be, but is not limited to, a portable or non-portable electronic device in a vehicle intelligence system. In an embodiment, the electronic device 100 may be, but is not limited to, a smart home appliance, such as a television, a computer, a refrigerator, a washing machine, a telephone, an induction cooker, a desk lamp, etc.

In the present embodiment, the display panel 130 includes a display pixel, a touch sensor, or a fingerprint sensor. The driver circuit 120 may be an integrated circuit chip driving and controlling the display panel 130 to perform a display operation, a touch sensing operation, or a fingerprint sensing operation. The touch sensor of the display panel 130 may be an in-cell touch sensor. In an embodiment, the display panel 130 may be an in-cell fingerprint, touch, and display panel embedded with a fingerprint sensor and a touch sensor, but the invention is not limited thereto. In an embodiment, the driver circuit 120 may drive and control the electronic device 100 to perform an in-display fingerprint recognition operation, that is, a fingerprint recognition operation. In an embodiment, the fingerprint sensor may be an optical fingerprint sensor.

In the present embodiment, the display data of the display panel 130 is transmitted by the processor circuit 110 to the display driver circuit 122 via MIPI. When the display panel 130 is operated in the first mode, the processor circuit 110 may transmit image data corresponding to the frame rate to the display driver circuit 122 according to different frame rates. In another case, the processor circuit 110 transmits image data with a fixed frame rate to the display driver circuit 122, and via the display driver circuit 122, an operation mode in which each area on the display panel 130 has a different frame rate is implemented. The display driver circuit 122 may control the opening or closing of a gate line or a scan line of the display panel 130 via a specific signal line, so that different areas on the display panel 130 may be operated at different frame rates. In this case, when the display panel 130 is operated in the second mode, the frame rate of the display panel 130 is the same as the frame rate of the image data transmitted by the processor circuit 110.

Regarding the hardware structure of the elements in the embodiment shown in FIG. 1, the processor circuit 110, the display driver circuit 122, and the touch driver circuit 124 may be processors having computing capabilities. As another option, the processor circuit 110, the display driver circuit 122, and the touch driver circuit 124 may be designed via hardware description language (HDL) or any other digital circuit design method familiar to those skilled in the art, and may be hardware circuits implemented via a field-programmable gate array (FPGA), a complex programmable logic device (CPLD), or an application-specific integrated circuit (ASIC). Moreover, sufficient teaching, suggestion, and implementation description of the hardware structures of the processor circuit 110, the display driver circuit 122, and the touch driver circuit 124 may be obtained by referring to common knowledge in the art.

Figure 2:
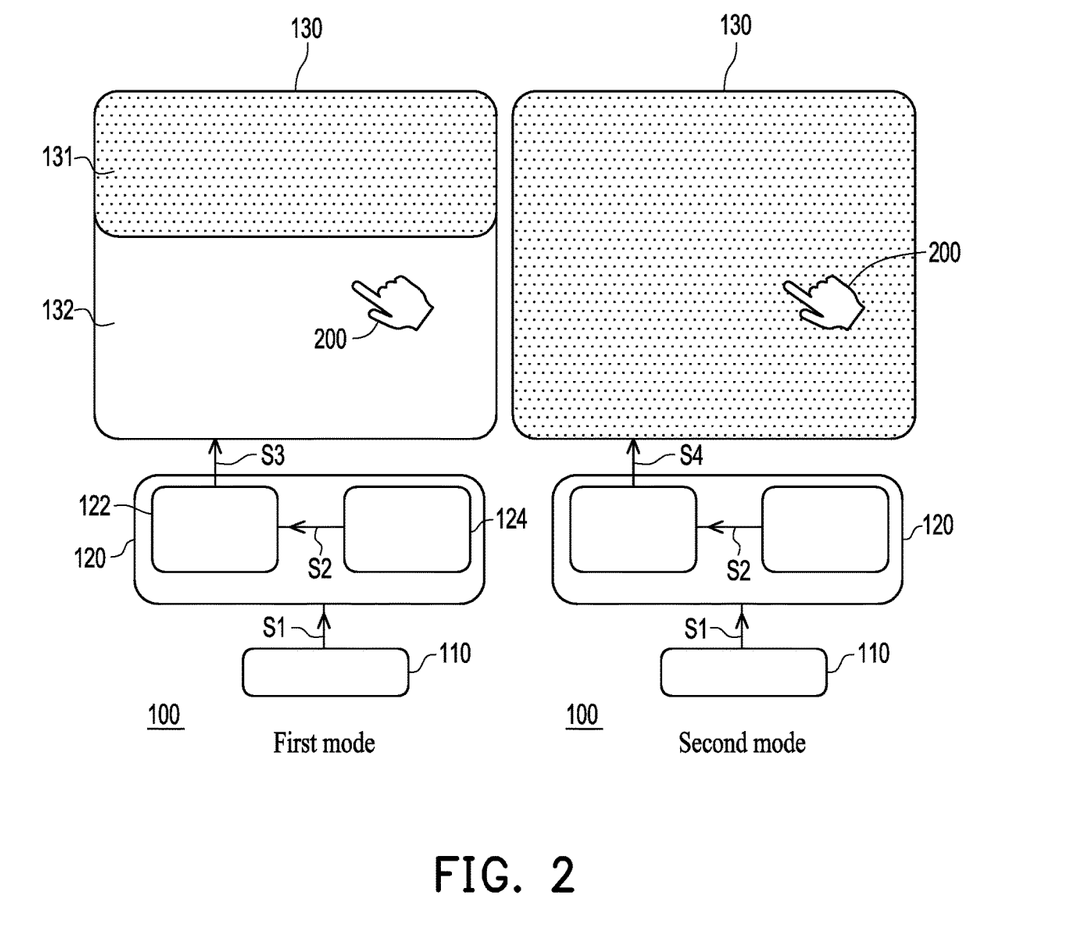
FIG. 2 shows a schematic diagram of an electronic device of an embodiment of the invention switching from a first mode to a second mode.

FIG. 2 shows a schematic diagram of an electronic device of an embodiment of the invention switching from a first mode to a second mode. Please refer to FIG. 2. In the present embodiment, the processor circuit 110 outputs image data S1 to the display driver circuit 122. The display driver circuit 122 drives the display panel 130 according to the image data S1, so that the display panel 130 is operated in the first mode.

Specifically, the display driver circuit 122 outputs an enable signal S3 so that the display panel 130 is operated in the first mode. The display panel 130 includes a first area 131 and a second area 132. In the first mode, the first area 131 has a first frame rate and the second area 132 has a second frame rate. The second frame rate is less than the first frame rate. That is, in the first mode, the first area 131 is operated at a high frame rate, and the second area 132 is operated at a low frame rate.

In some practical application scenarios, the first area 131 displays dynamic image content, for example, and therefore is operated at a high frame rate to maintain display quality. For example, the second area 132 displays static image content or the image content does not need to be updated, and therefore may be operated at a low frame rate to reduce power consumption.

When the touch driver circuit 124 detects the touch event 200, the display driver circuit 122 drives the display panel 130 to be switched from the first mode to the second mode. For example, when the touch driver circuit 124 detects that the touch event 200 occurs in the second area 132, the touch driver circuit 124 outputs a detection result S2 to the display driver circuit 122. Therefore, the display driver circuit 122 outputs a switching signal S4 to drive the display panel 130 to be switched from the first mode to the second mode, so that the second area 132 is operated at a high frame rate. Therefore, in the second mode, both the first area 131 and the second area 132 are operated at a high frame rate, and the entire area of the display panel 130 has the same frame rate. The touch event 200 is, for example, various touch events such as a finger click, a continuous touch, or a continuous touch of the second area 132.

In other words, in the present embodiment, when the touch driver circuit 124 detects that a finger touches the display panel 130, the driver circuit 120 controls the display panel 130 to actively exit the first mode and enter the second mode. The full screen of the display panel 130 maintains a high frame rate, so that the user may obtain a good user experience when performing a touch operation. During this process, the driver circuit 120 detects the behavior of the user touching the screen via the touch driver circuit 124 and actively controls whether the display panel 130 displays different frame rates in different areas. Therefore, the driver circuit 120 may actively perform switching without waiting for instructions from the processor circuit 110. Since there is no need to wait for instructions from the processor circuit 110, the load on the processor circuit 110 may be reduced, and the driver circuit 120 may switch the display panel 130 back to a high frame rate more instantly. Moreover, since the driver circuit 120 directly detects the behavior of the user touching the screen via the touch driver circuit 124, the driver circuit 120 may obtain more touch characteristic information, and may perform a more delicate switching operation than waiting for instructions from the processor circuit 110.

Therefore, in the present embodiment, when a finger is detected on the display panel 130, the driver circuit 120 may automatically stop the dynamic frequency conversion function to switch to the second mode; when the finger leaves the display panel 130, the driver circuit 120 returns to the first mode to automatically start the dynamic frequency conversion function.

Therefore, in an application scenario of an embodiment of the invention, only when the touch driver circuit 124 detects a touch event at a specific position is the display panel 130 switched back to the frame rate of the normal mode. For example, when the touch driver circuit 124 detects that an area of low frame rate is touched, the display panel 130 is switched back to the frame rate of the normal mode (high frame rate).

In an embodiment, the processor circuit 110 may determine whether the display panel 130 enters the first mode (MAFR mode), and then the driver circuit 120 may determine whether the display panel 130 leaves the first mode. In another embodiment, whether the display panel 130 enters or leaves the first mode may both be determined by the driver circuit 120.

In the embodiment of FIG. 2, the display panel 130 is divided into two areas as an example, but the invention is not limited thereto. In an embodiment, the display panel 130 may also be divided into two or more areas, such as four areas.

Figure 3:
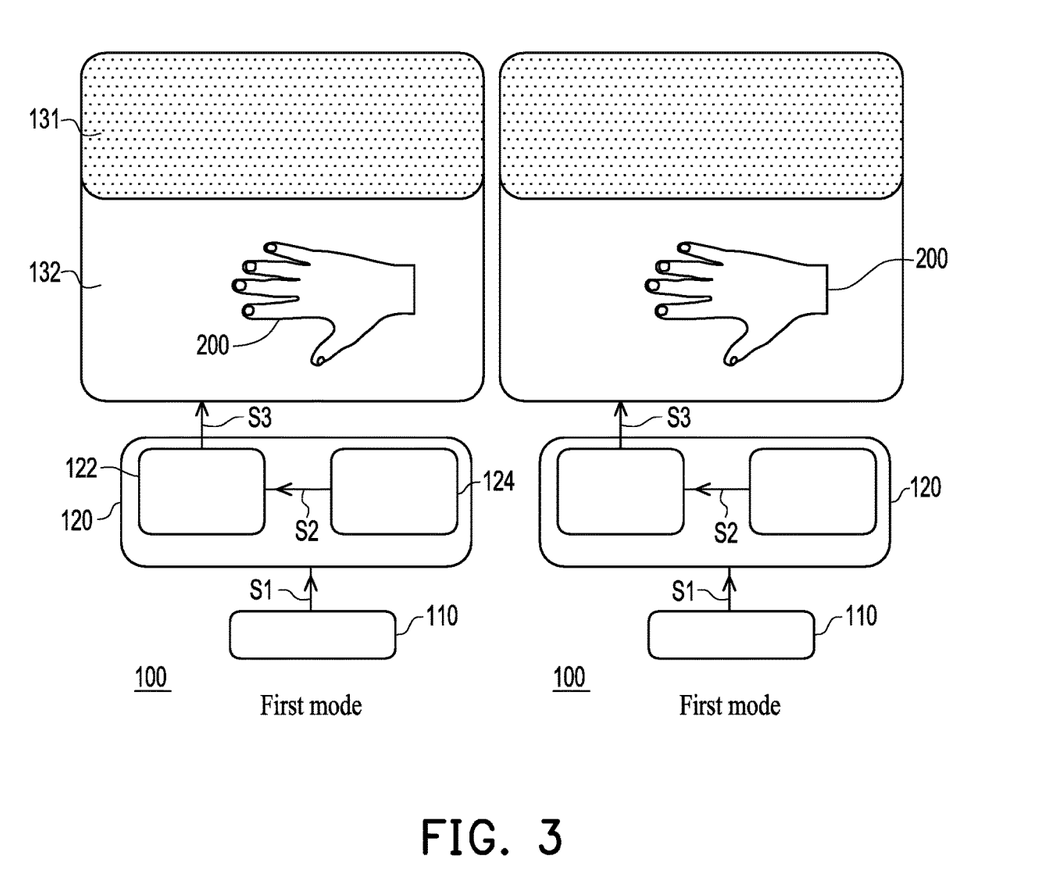
FIG. 3 shows a schematic diagram of an electronic device of an embodiment of the invention maintained in the first mode.

FIG. 3 shows a schematic diagram of an electronic device of an embodiment of the invention maintained in the first mode. Please refer to FIG. 3. In the present embodiment, the electronic device 100 is initially operated in the first mode. When the touch driver circuit 124 detects the touch event 200 occurs in the second area 132, the display driver circuit 122 drives the display panel 130 so that the second area 132 is operated at a third frame rate, wherein the third frame rate is less than the second frame rate. In this example, the touch event 200 is that the palm of the user covers the second area 132 of the display panel 130.

In the present embodiment, when the palm of the user covers the second area 132 of the display panel 130, the touch driver circuit 124 does not notify the processor circuit 110 that the touch event 200 occurs. The display driver circuit 122 may set the second area 132 covered by the palm of the user to a lower third frame rate to further reduce power consumption.

Figure 4:
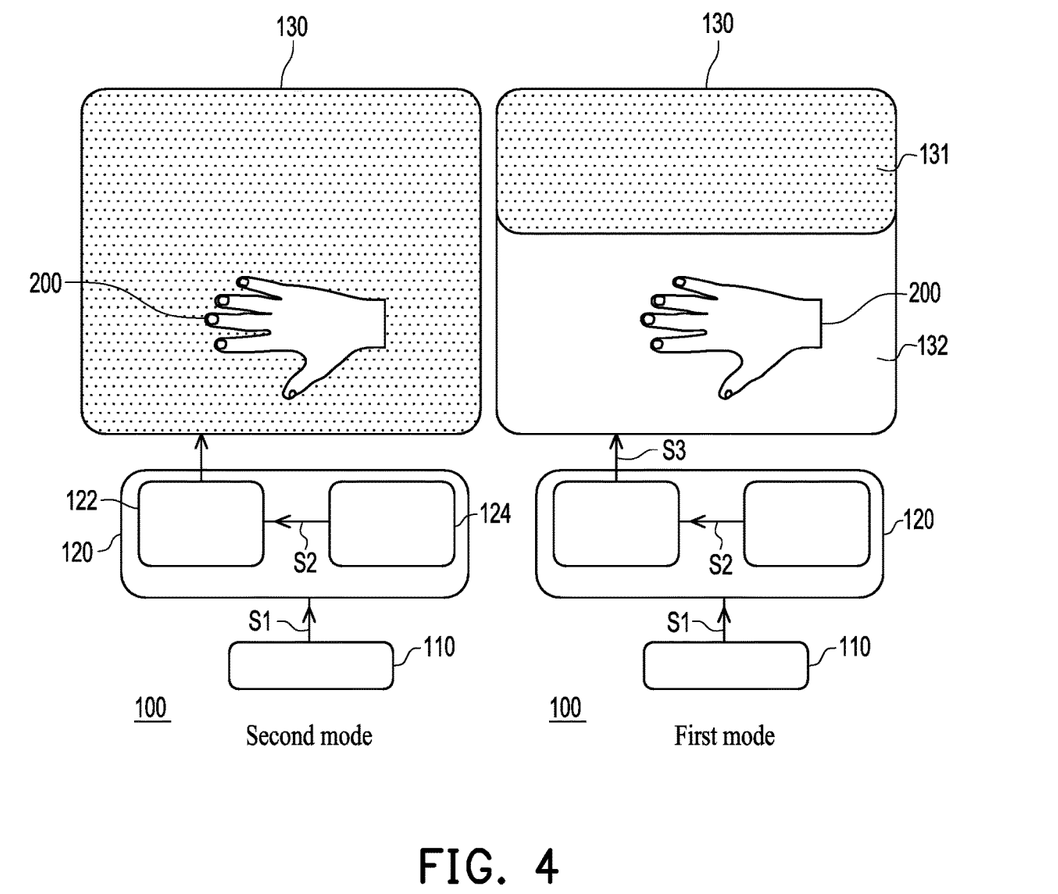
FIG. 4 shows a schematic diagram of an electronic device of an embodiment of the invention switching to the first mode.

FIG. 4 shows a schematic diagram of an electronic device of an embodiment of the invention switching to the first mode. Please refer to FIG. 4. In the present embodiment, the electronic device 100 is initially operated in the second mode. When the touch driver circuit 124 detects that the palm of the user covers the second area 132 of the display panel 130, the display driver circuit 122 drives the display panel 130 to be switched to the first mode.

In the present embodiment, when the palm of the user covers the second area 132 of the display panel 130, the touch driver circuit 124 also does not notify the processor circuit 110 that the touch event 200 occurs. The display driver circuit 122 may automatically turn on area frequency conversion via touch information to switch the display panel 130 to the first mode to reduce power consumption.

Figure 5:
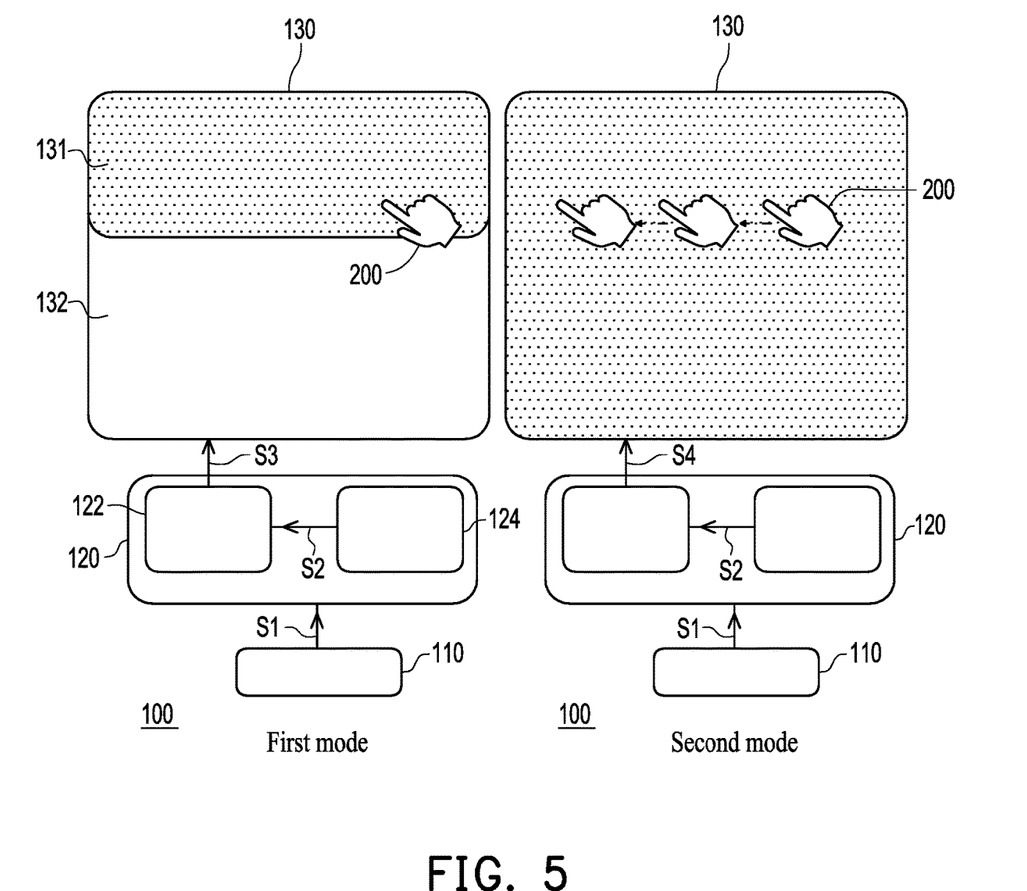
FIG. 5 shows a schematic diagram of an electronic device of an embodiment of the invention switching from the first mode to the second mode.

FIG. 5 shows a schematic diagram of an electronic device of an embodiment of the invention switching from the first mode to the second mode. Referring to FIG. 5, in the present embodiment, when the touch driver circuit 124 detects that the touch event 200 occurring in the first area 131 indicates that the object does not move, the display driver circuit 122 may drive the display panel 130 so that the display panel 130 continues to be operated in the first mode. In other words, when the touch driver circuit 124 detects the touch event 200 occurs in the first area, the display driver circuit 122 drives the display panel 130 so that the display panel 130 continues to be operated in the first mode.

Next, when the touch driver circuit 124 detects that the touch event 200 occurring in the first area 131 is a movement of an object, the display driver circuit 122 drives the display panel 130 to be switched from the first mode to the second mode. The moving trajectory of the object includes straight trajectory, diagonal trajectory, or curved trajectory.

Therefore, in an application scenario of an embodiment of the invention, when the touch driver circuit 124 detects that the touch trajectory matches a certain type, the display panel 130 is switched back to the frame rate of the normal mode (high frame rate). Examples include a specific trajectory such as sliding from bottom to top, sliding from left to right, or sliding from right to left (not limited to straight trajectory).

Therefore, in the present embodiment, when the user uses only one finger and does not move, the display panel 130 still maintains the area frequency conversion function. However, when the finger starts to slide, the display panel 130 may automatically stop the partition frequency conversion function, allowing the user to operate the screen more smoothly.

Figure 6:
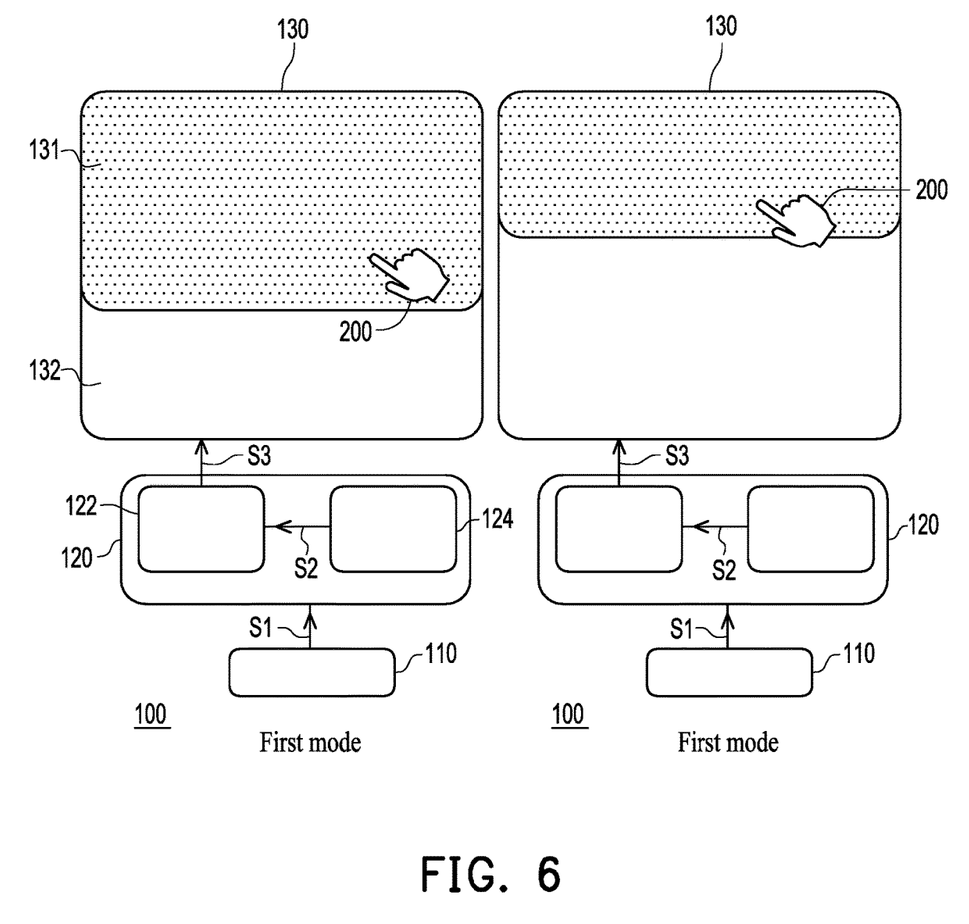
FIG. 6 shows a schematic diagram of an electronic device of an embodiment of the invention maintained in the first mode.

FIG. 6 shows a schematic diagram of an electronic device of an embodiment of the invention maintained in the first mode. Please refer to FIG. 6. In the present embodiment, the electronic device 100 is initially operated in the first mode. When the user's finger 200 touches the first area 131 of the display panel 130, the position of the finger 200 may be detected via the touch driver circuit 124 to dynamically adjust the partition range of high and low frame rates, so that the position touched by the finger 200 maintains a high frame rate, and the position not touched by the finger 200 maintains a low frame rate. Visual performance is optimized via dynamically changing partitions, while also achieving the effect of saving power.

Figure 7:
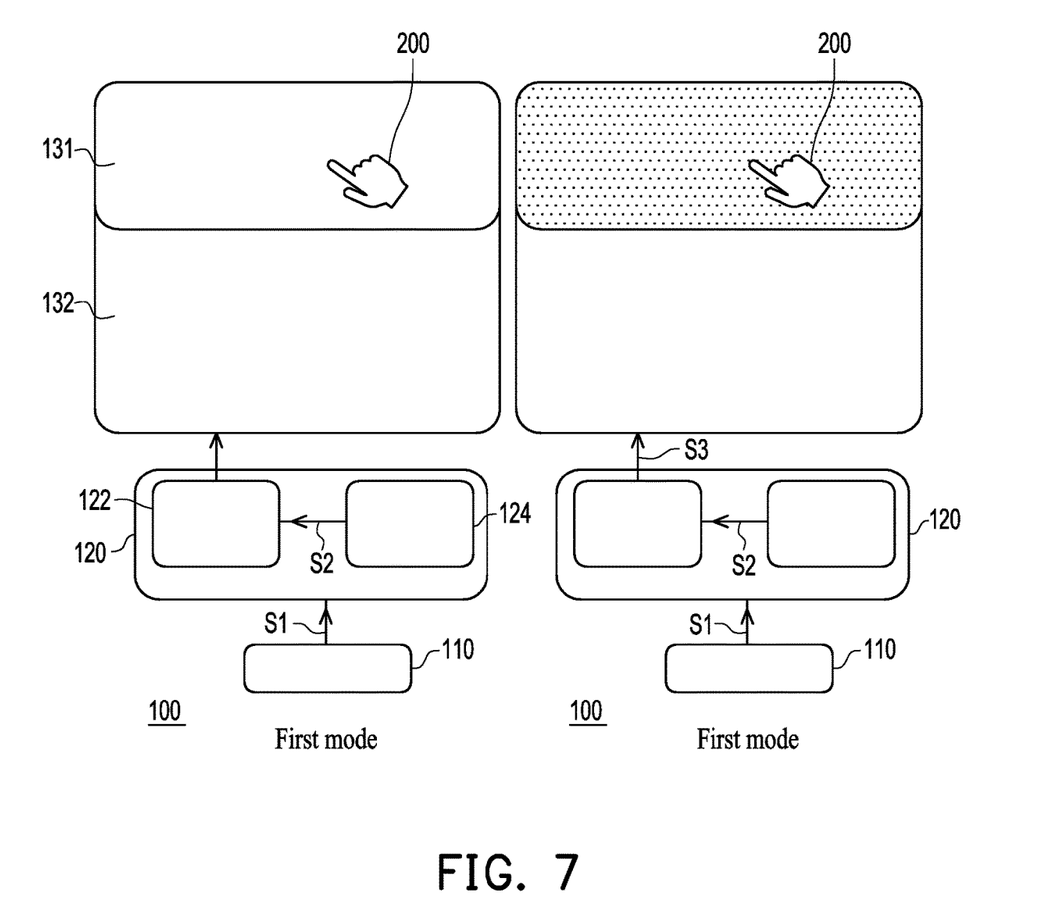
FIG. 7 shows a schematic diagram of an electronic device of an embodiment of the invention returning from the second mode to the first mode.

FIG. 7 shows a schematic diagram of an electronic device of an embodiment of the invention returning from the second mode to the first mode. Referring to FIG. 7, in the present embodiment, when the touch driver circuit 124 detects the touch event 200 occurs in the first area 131, the display driver circuit 122 drives the display panel 130 so that the first area 131 is switched to the second frame rate, as shown in the left figure. Next, when the touch driver circuit 124 detects the touch event 200 occurs in the first area 131 again, the display driver circuit 122 drives the display panel 130 so that the first area 131 returns to the first frame rate, as shown in the right figure.

Therefore, in an application scenario of an embodiment of the invention, when the touch driver circuit 124 detects a touch event occurs in an area of high frame rate, the display panel 130 may be inactive or be switched from high frame rate to low frame rate. For example, the area of high frame rate is the area where videos are displayed. When the touch driver circuit 124 detects a touch, it may be just the user pausing the video playback. Therefore, at this time, the entire area may be changed to a low frame rate update, until the user touches the area of high frame rate again, indicating that the user wants to continue playing the video. Therefore, the area of high frame rate continues to maintain high frame rate, and the area of low frame rate maintains low frame rate.

Figure 8:
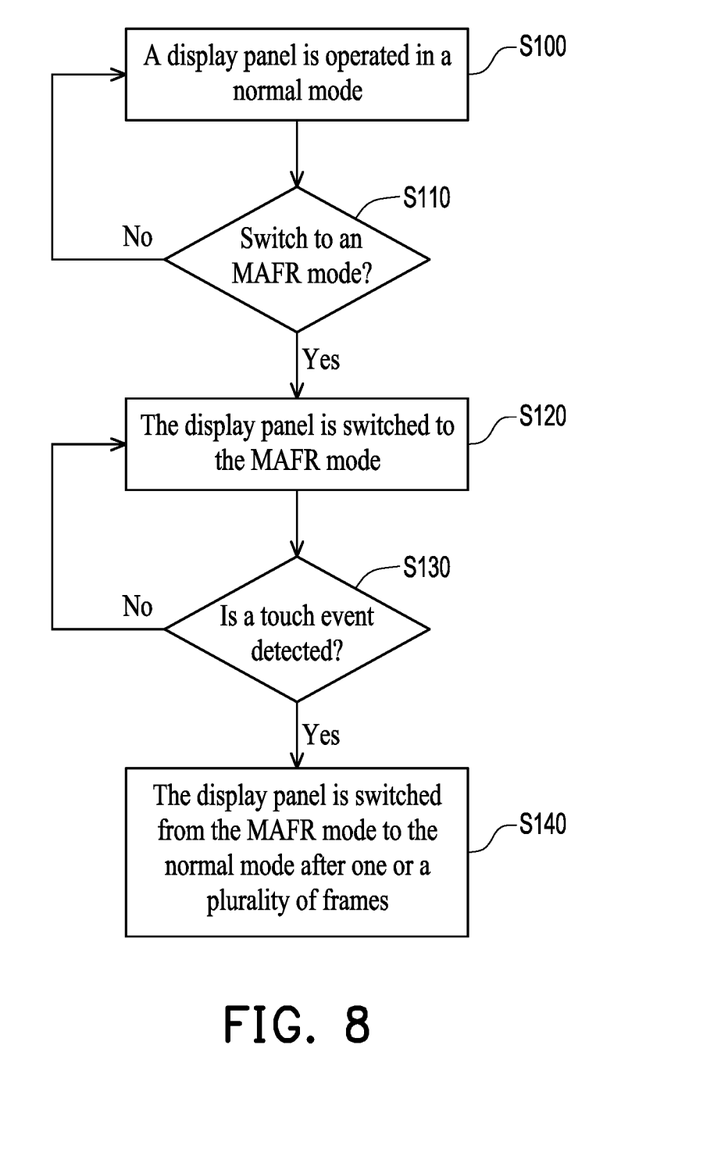
FIG. 8 is a flowchart of steps of an operation method of an electronic device of an embodiment of the invention.

FIG. 8 is a flowchart of steps of an operation method of an electronic device of an embodiment of the invention. Please refer to FIG. 1, FIG. 2, and FIG. 8. The operation method of the electronic device of the present embodiment is at least applicable to the electronic device 100 of FIG. 1 and FIG. 2, but the invention is not limited thereto. Taking the electronic device 100 of FIG. 1 and FIG. 2 as an example, in step S100, the display panel 130 is operated in the normal mode. In step S110, the driver circuit 120 determines whether to switch the display panel 130 to the MAFR mode according to the received image data. If not, the method flow returns to step S100, and the display panel 130 continues to be operated in the normal mode. If yes, the method flow performs step S120.

In step S120, the driver circuit 120 drives the display panel 130 to be operated in the MAFR mode. Next, in step S130, the driver circuit 120 determines whether to drive the display panel 130 to be switched from the MAFR mode to the normal mode according to whether a specific touch event is detected. If a specific touch event is detected, in step S140, the driver circuit 120 drives the display panel 130 to be switched from the MAFR mode to the normal mode. If no specific touch event is detected, the method flow returns to step S120, and the display panel 130 continues to be operated in the MAFR mode.

In addition, sufficient teaching, suggestion, and implementation description of the operation method of the electronic device of an embodiment of the invention may be obtained from the descriptions of the embodiments in FIG. 1 to FIG. 7, and therefore the operation method of the electronic device of an embodiment of the invention is not described again.

Based on the above, in an embodiment of the invention, in the first mode (MAFR mode), when the driver circuit detects a specific touch event, the display panel returns from the first mode to the second mode (normal mode), which is a full-screen mode with the same frame rate. In an embodiment of the invention, the processor circuit does not change the action thereof of transmitting image data, and the operation of partition frequency conversion is performed by the driver circuit. In other words, the processor circuit still updates the image screen according to the original settings thereof, but via the action of the driver circuit, the image screen in some areas is not updated on the display panel. In addition, the processor circuit does not know whether there is an operation of partitioned frequency conversion on the display panel. Via the operation method of an embodiment of the invention, the visual performance of the electronic device may be optimized, and at the same time, the electronic device may have a power-saving effect, so that the user may have a good user experience when performing a touch operation.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A driver circuit, driving a display panel, the driver circuit comprising:
   a display driver circuit drives the display panel to be operated in a first mode or a second mode, wherein in the first mode, different areas of the display panel have different frame rates, and in the second mode, the different areas of the display panel have a same frame rate; and
   a touch driver circuit coupled to the display driver circuit, wherein when the touch driver circuit detects a touch event, the display driver circuit drives the display panel to be switched from the first mode to the second mode.

2. The driver circuit of claim 1, wherein the display panel comprises a first area and a second area, and in the first mode, the first area has a first frame rate, and the second area has a second frame rate, and the second frame rate is less than the first frame rate,
   wherein when the touch driver circuit detects the touch event occurs in the second area, the display driver circuit drives the display panel to be switched from the first mode to the second mode.

3. The driver circuit of claim 1, wherein the display panel comprises a first area and a second area, and in the first mode, the first area has a first frame rate, and the second area has a second frame rate, and the second frame rate is less than the first frame rate,
   wherein when the touch driver circuit detects the touch event occurs in the second area, the display driver circuit drives the display panel so that the second area is operated at a third frame rate, wherein the third frame rate is less than the second frame rate.

4. The driver circuit of claim 1, wherein the display panel comprises a first area and a second area, and in the first mode, the first area has a first frame rate, and the second area has a second frame rate, and the second frame rate is less than the first frame rate,
   wherein when the touch driver circuit detects the touch event occurs in the first area, the display driver circuit drives the display panel so that the display panel continues to be operated in the first mode.

5. The driver circuit of claim 1, wherein the display panel comprises a first area and a second area, and in the first mode, the first area has a first frame rate, and the second area has a second frame rate, and the second frame rate is less than the first frame rate,
   wherein when the touch driver circuit detects the touch event occurs in the first area, the display driver circuit drives the display panel so that the first area is switched to the second frame rate.

6. The driver circuit of claim 4, wherein when the touch driver circuit detects the touch event occurs in the first area again, the display driver circuit drives the display panel so that the first area returns to the first frame rate.

7. The driver circuit of claim 1, wherein when the touch driver circuit detects that the touch event is a movement of an object, the display driver circuit drives the display panel to be switched from the first mode to the second mode.

8. The driver circuit of claim 7, wherein a movement trajectory of the object comprises a straight trajectory, a diagonal trajectory, or a curved trajectory.

9. The driver circuit of claim 7, wherein when the touch driver circuit detects that the touch event is that the object does not move, the display driver circuit drives the display panel so that the display panel continues to be operated in the first mode.

10. The driver circuit of claim 1, wherein the display panel is switched from the first mode to the second mode after one or a plurality of frames.

* * * * *